(12) United States Patent
Mackey et al.

(10) Patent No.: US 7,591,291 B2
(45) Date of Patent: Sep. 22, 2009

(54) REFUELING ASSEMBLY HAVING A CHECK VALVE RECEPTACLE AND A REPLACEABLE FUEL RECEIVER FOR BOTTOM-FILLED FUEL TANKS

(76) Inventors: Dean E. Mackey, 1190 N. Spring Creek Pl., Springville, UT (US) 84663; Kenneth V. Jensen, 55 N. 1360 East, Springville, UT (US) 84663

( * ) Notice: Subject to any disclaimer, the term of this patent is extended or adjusted under 35 U.S.C. 154(b) by 616 days.

(21) Appl. No.: 10/571,445

(22) PCT Filed: Mar. 17, 2005

(86) PCT No.: PCT/US2005/009099
§ 371 (c)(1),
(2), (4) Date: Mar. 13, 2006

(87) PCT Pub. No.: WO2005/089482
PCT Pub. Date: Sep. 29, 2005

(65) Prior Publication Data
US 2007/0062603 A1  Mar. 22, 2007

Related U.S. Application Data

(60) Provisional application No. 60/554,434, filed on Mar. 18, 2004.

(51) Int. Cl.
B65B 1/04 (2006.01)

(52) U.S. Cl. .................... 141/113; 137/512.3; 137/513; 137/614.19; 137/614.2

(58) Field of Classification Search .................. 141/113, 141/346–350; 137/511, 512, 512.3, 513, 137/614.19, 614.2, 613
See application file for complete search history.

(56) References Cited

U.S. PATENT DOCUMENTS

| | | | | | |
|---|---|---|---|---|---|
| 2,384,628 | A | * | 9/1945 | Krone et al. | 141/113 |
| 2,522,406 | A | * | 9/1950 | Smith | 137/512.3 |
| 2,905,487 | A | * | 9/1959 | Schifter | 137/630.22 |
| 3,151,893 | A | * | 10/1964 | Lyon | 285/143.1 |
| 3,542,063 | A | * | 11/1970 | Etter et al. | 137/512.3 |
| 4,150,809 | A | * | 4/1979 | Muller | 251/149.4 |
| 4,591,298 | A | * | 5/1986 | Fukumori et al. | 405/282 |
| 2003/0015240 | A1 | * | 1/2003 | Nelson et al. | 137/541 |

* cited by examiner

*Primary Examiner*—Timothy L Maust
*Assistant Examiner*—Jason K Niesz
(74) *Attorney, Agent, or Firm*—Angus C. Fox, III

(57) ABSTRACT

A fuel receiver assembly, that permits replacement of a worn fuel receiver without draining the fuel tank, includes a check valve receptacle having a male-pipe-threaded nipple which engages the female-threaded pipe coupling of the fuel tank. The check valve receptacle has a spring-biased, normally closed check valve that prevents fuel from escaping from the fuel tank. Fuel pressure from the refueling pump opens the normally-closed check valve. The check valve receptacle is designed to be a relatively permanent installation in the fuel tank, having ultra-low-wear components. The check valve receptacle also has a female-threaded socket that is coaxial with the male-pipe-threaded nipple. A specially-designed male-threaded fuel receiver engages the female-threaded socket. Sealing between the check valve receptacle and the replaceable fuel receiver is accomplished by an O-ring seal installed on the fuel receiver.

19 Claims, 13 Drawing Sheets

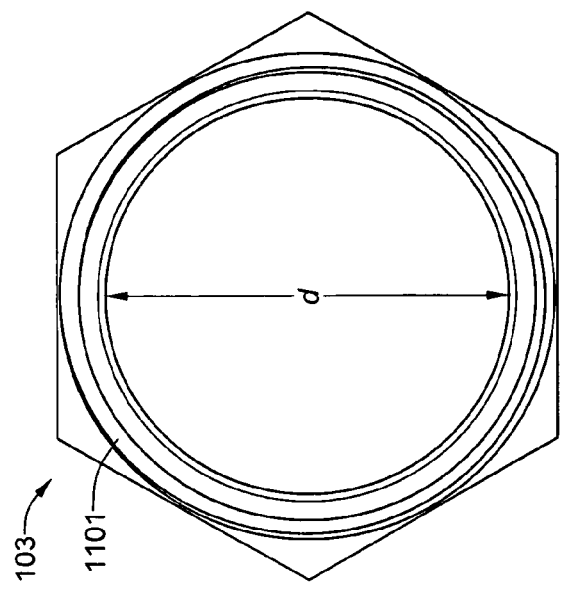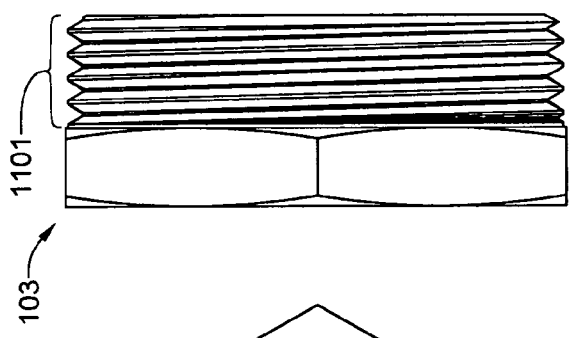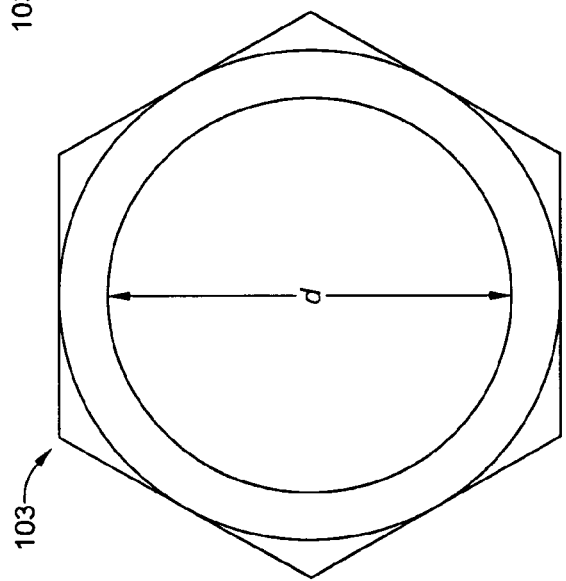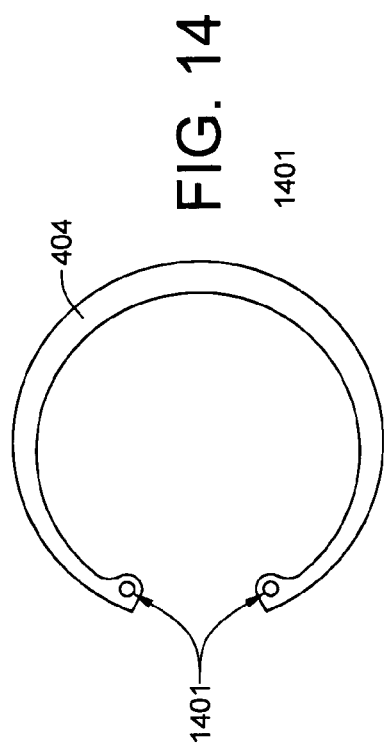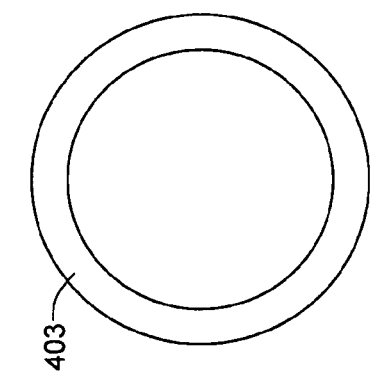

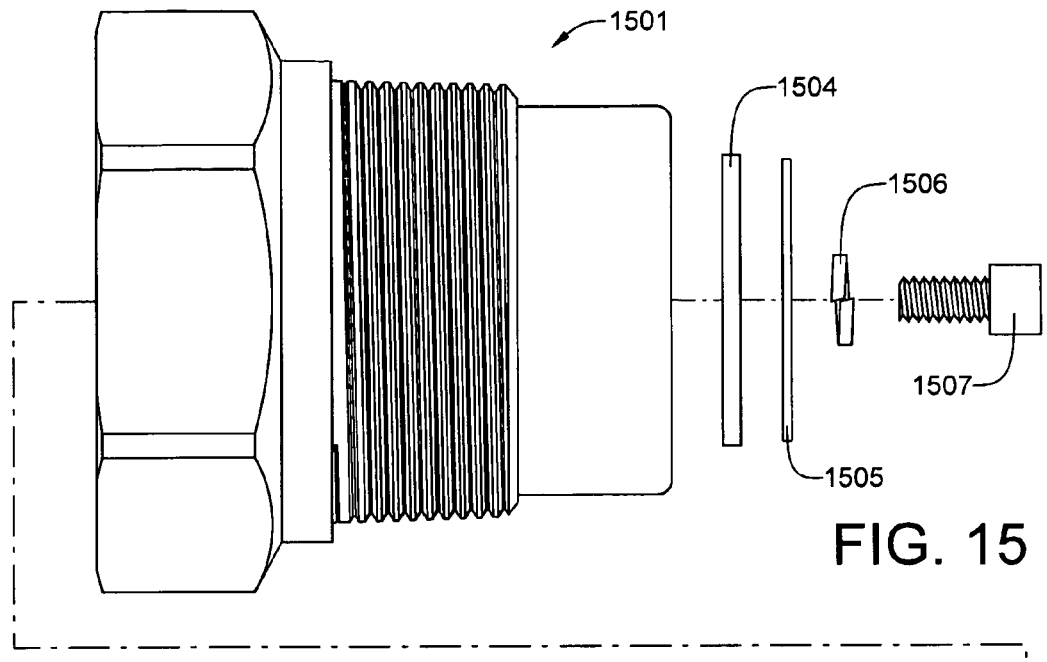
FIG. 15
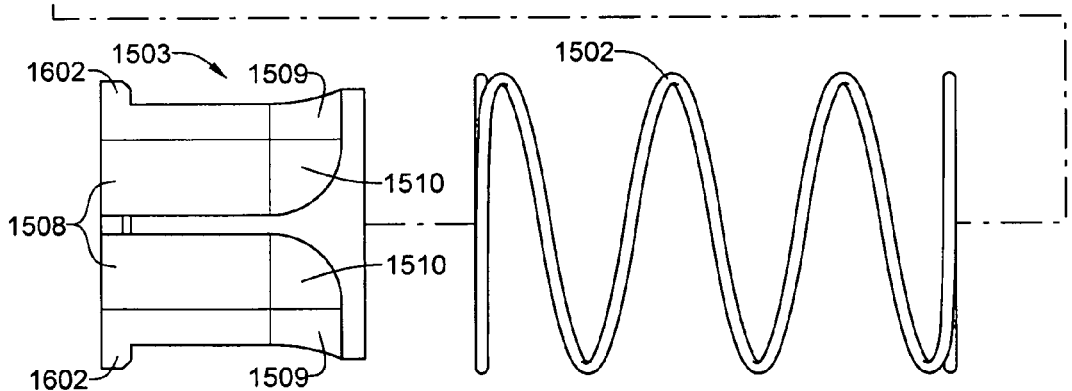
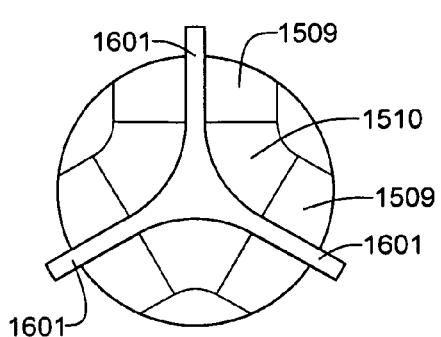
FIG. 16
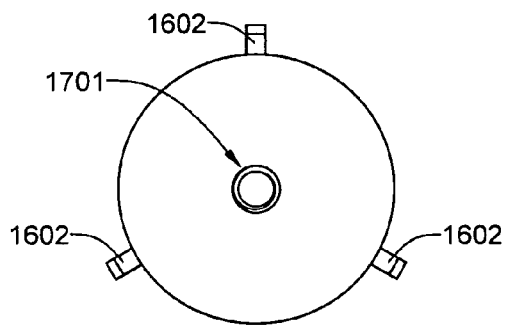
FIG. 17

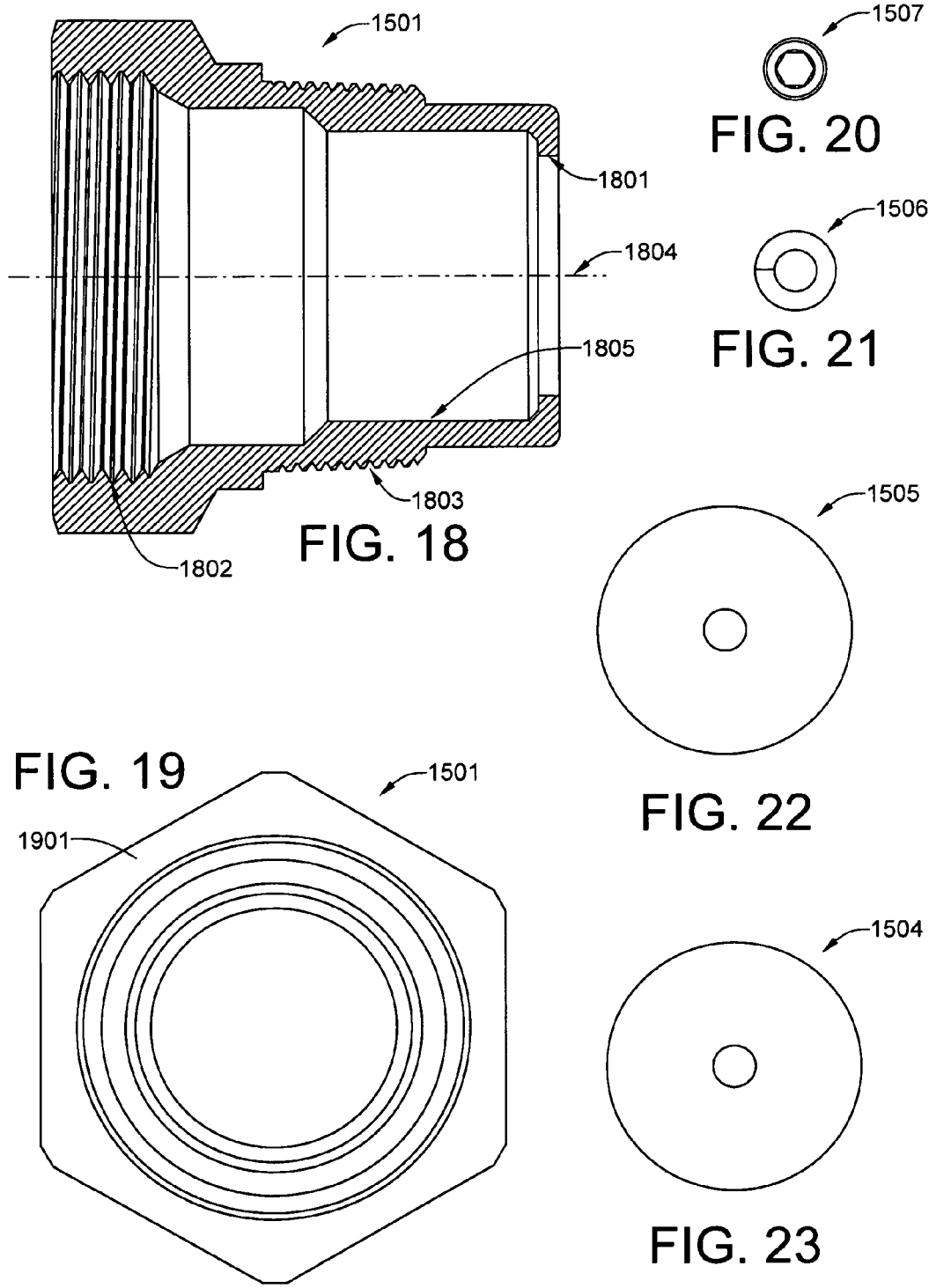

REFUELING ASSEMBLY HAVING A CHECK VALVE RECEPTACLE AND A REPLACEABLE FUEL RECEIVER FOR BOTTOM-FILLED FUEL TANKS

This application has a priority date based on Provisional Patent Application No. 60/554,434, which has a filing date of Mar. 18, 2004.

BACKGROUND OF THE INVENTION

1. Field of the Invention

This invention relates generally to refueling systems for high-volume bottom-filled tanks on industrial vehicles and, more specifically, to hose-to-tank connectors which incorporate a fuel receiver and a check valve.

2. Description of the Prior Art

Industrial vehicles, such as ore-hauling trucks used in open pit mines, typically have fuel capacities of several hundred gallons. Time spent for maintenance and refueling is time that is idle and non-productive. Because the idling of equipment usually carries with it the idling of workers, it is in the best interest of the owner of such equipment to minimize maintenance and refueling time, particularly if the minimization can be achieved with no adverse effect on the equipment.

Bottom-filled fuel tanks typically have a coupler with female pipe threading welded in the bottom portion thereof. A conventional, normally-closed fuel receiver, having male pipe threading, engages the coupler. A specially designed nozzle can be mated with the receiver to fill the tank. Such a nozzle is shown and disclosed in U.S. Pat. No. 3,662,793, which issued on May 16, 1972 to Jay V. Calisher and Ross E. Burbick and was assigned to E. B. Wiggins, Inc. Of Los Angeles, Calif. A significant problem associated with conventional fuel receivers is that the receivers tend to wear rather rapidly. When a receiver is worn, it causes the nozzle to leak during the refueling operation. When the leakage becomes serious, the fuel receiver must be replaced. Although replacement of a conventional worn fuel receiver is a relatively simple, straight forward operation, it must be done when the tank is empty. Unfortunately, it is nearly impossible to empty the tank during operation of the equipment, as the tank will most likely not run dry near refueling equipment. Therefore, the common replacement procedure is to take the vehicle to a service and refueling location, drain the fuel tank, remove the worn fuel receiver, install a new fuel receiver, and then refuel the tank. Thus, a seemly simple task is transformed into a major operation.

What is needed is an improved fuel receiver assembly that facilitates replacement of worn parts without the need to drain the fuel tank. Ideally, the improved fuel receiver assembly would require no redesign of the fuel tank and could be retrofitted to existing fuel tanks.

SUMMARY OF THE INVENTION

The present invention provides a specially designed fuel receiver and check valve assembly that facilitates replacement of a worn fuel receiver without the need to drain the fuel tank. The fuel receiver has a body with a generally tubular interior open at both ends. There is an annular circumferential shoulder near an exit end thereof. A spring-loaded valve plug operating within a portion of the fuel receiver chamber of conical section has an operculum seal. The valve plug is unseated by the urging of a plug release piston of a fuel nozzle which engages the fuel receiver, thereby permitting fuel to flow through the receiver. The check valve includes a check valve body having a male-pipe-threaded nipple which engages the female-threaded pipe coupling of the fuel tank. The check valve receptacle also has a female-threaded socket that is coaxial with the male-pipe-threaded nipple. An annular securing nut slides over the fuel receiver body, bears against the annular circumferential shoulder and engages the female-threaded socket of the check valve body, thereby securing the fuel receiver body to the check valve body. The check valve also has a spring-biased, normally closed poppet valve assembly that prevents fuel from escaping from the fuel tank even when the fuel receiver is removed from the check valve. Fuel pressure from a refueling pump is sufficient to open the normally-closed check valve. Alternatively, a check valve poppet engagement rod attached to the valve plug of the fuel receiver can mechanically displace the check valve poppet.

The check valve is designed to be a generally permanent installation in the fuel tank, having ultra-low-wear components. For a preferred embodiment of the invention, sealing between the receptacle and the receiver unit is accomplished by an O-ring seal installed in an annular groove on the fuel receiver unit, which is compressed against an inner cylindrical sealing surface on the check valve receptacle. The design of the improved fuel receiver assembly permits removal of the fuel receiver from the check valve receptacle without the leakage of fuel within the tank, as the check valve prevents the escape of fuel even when the fuel receiver unit is removed from the assembly. A special wrench set has been designed to permit removal of the fuel receiver from the assembly. In addition, the fuel receiver can be disengaged from the check valve and a check valve drain insert can be installed in place of the fuel receiver. The check valve drain insert has a nose that releases the check valve poppet, thereby allowing fuel to be drained from the fuel tank.

By providing a second sealing assembly, the present invention has the following additional advantages over conventional fuel receiver assemblies: it protects workers from being sprayed with fuel during a malfunction of the fuel receiver poppet; it acts as a theft deterrent, in that theft cannot be drained from the tank by merely opening the fuel receiver poppet; and the environment is protected by the minimization of fuel leakage and spillage.

BRIEF DESCRIPTION OF THE DRAWINGS

FIG. 10 is an outer end elevational view of the annular securing nut;

FIG. 11 is a side elevational view of the annular securing nut;

FIG. 12 is an inner end elevational view of the annular securing nut;

FIG. 13 is a top or bottom plan view of the backing washer;

FIG. 14 is a top or bottom plan view of the internal snap ring;

FIG. 15 is an exploded side elevational view of the check valve;

FIG. 16 is an inner end elevational view of the check valve poppet;

FIG. 17 is an outer end elevational view of the check valve poppet;

FIG. 18 is a cross sectional view of the check valve body, taken through its central axis;

FIG. 19 is large end elevational view of the check valve body;

FIG. 20 is an elevational view of the head end of the check valve seal-retaining socket-head screw;

FIG. 21 is a top or bottom plan view of the lock washer used to secure the seal-retaining socket-head screw;

FIG. 22 is a top or bottom plan view of the fender washer used as a backing for the rubber seal secured to the check valve poppet;

FIG. 23 is a top or bottom plan view of the rubber seal that is secured to the check valve poppet;

PREFERRED EMBODIMENT OF THE INVENTION

The fuel receiver and check valve assembly, as well as the check valve drain insert, will now be described in detail with reference to the attached drawing figures.

Figure 1:
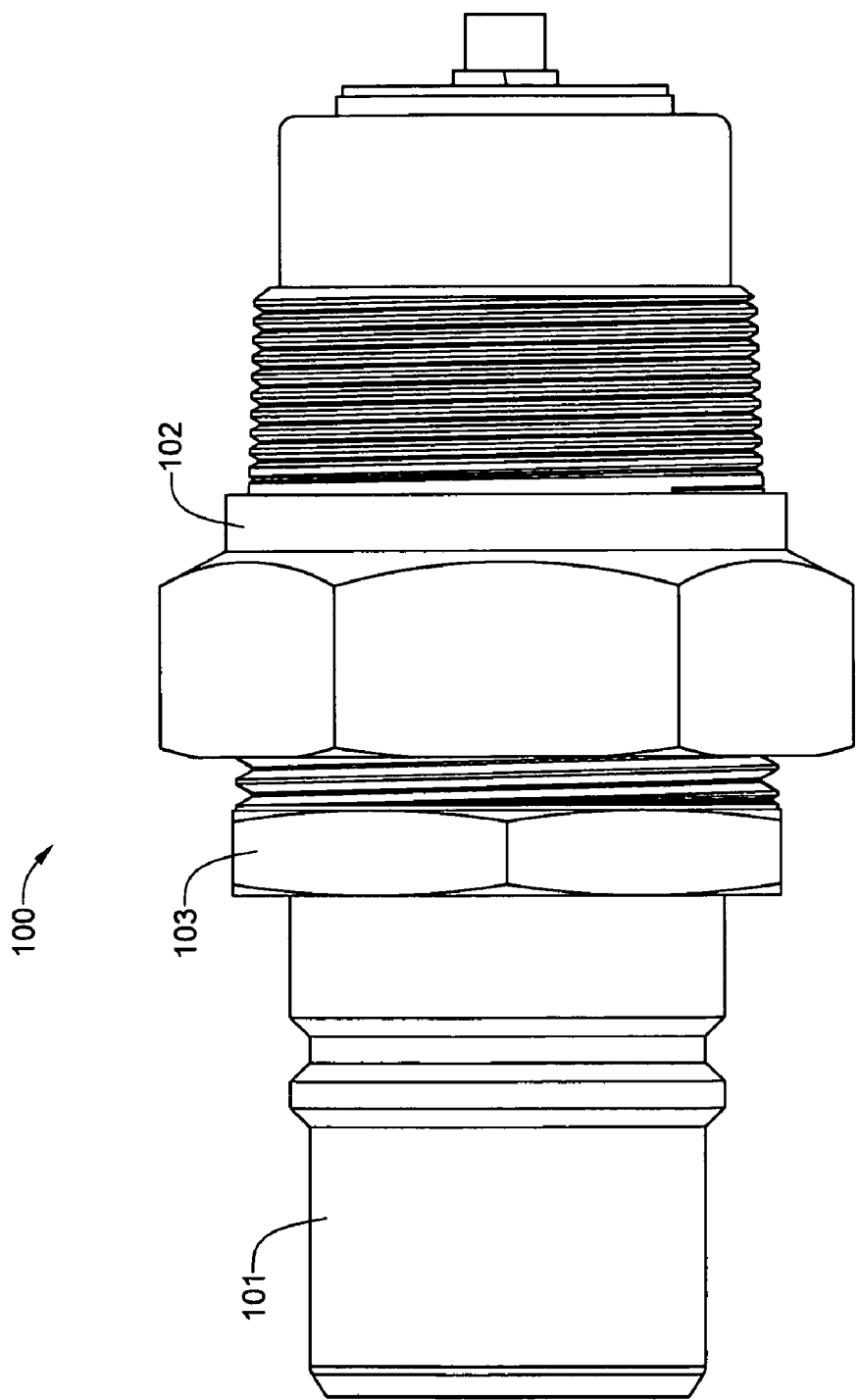
FIG. 1 is a side elevational view of a complete fuel receiver and check valve assembly.

Referring now to the complete fuel receiver and check valve assembly 100 of FIG. 1, the fuel receiver 101 has been secured within the check valve 102 with an annular securing nut 103.

Figure 2:
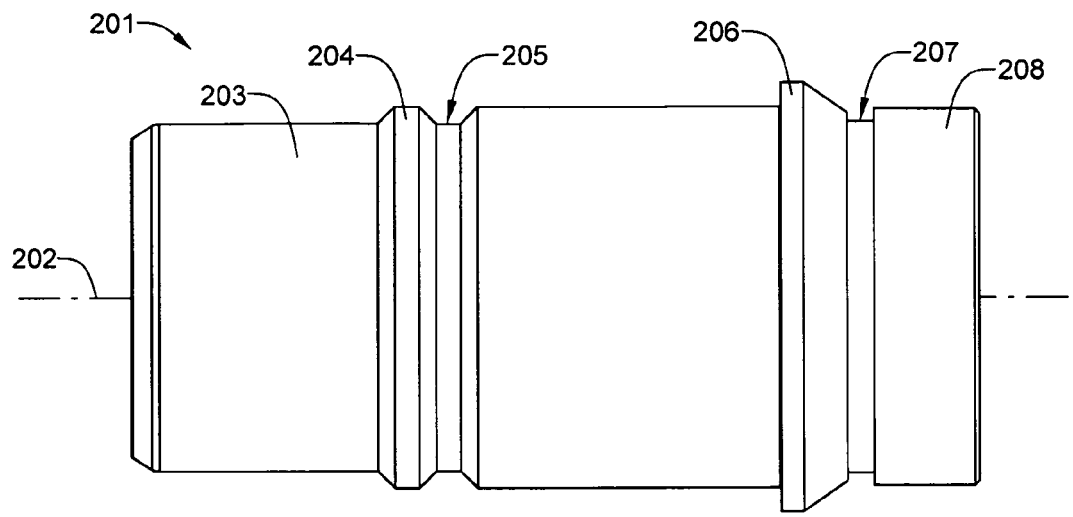
FIG. 2 is a side elevational view of the fuel receiver body.

Referring now to FIG. 2, the fuel receiver body 201 is radially symmetrical about a central axis 202, and has a cylindrical male coupler portion 203 that is equipped with a tapered annular ridge 204, that is followed by a tapered annular groove 205. A high-flow filler nozzle having a cylindrical female coupler, engages and releaseably locks on to the cylindrical male coupler 203. As previously mentioned, such a nozzle is disclosed in U.S. Pat. No. 4,919,174 to Warland. The fuel receiver body 201 also has an annular shoulder 206 and an O-ring groove 207 near an outlet end 208. The annular securing nut 103 seen in FIG. 1 bears against the annular shoulder 206 and secures the outlet end 208 of the fuel receiver body 201 to the check valve 102. For a preferred embodiment of the invention, the fuel receiver body 201 is fabricated from a tough, wear-resistant metal such as brass, chrome-plated steel or stainless steel.

Figure 3:
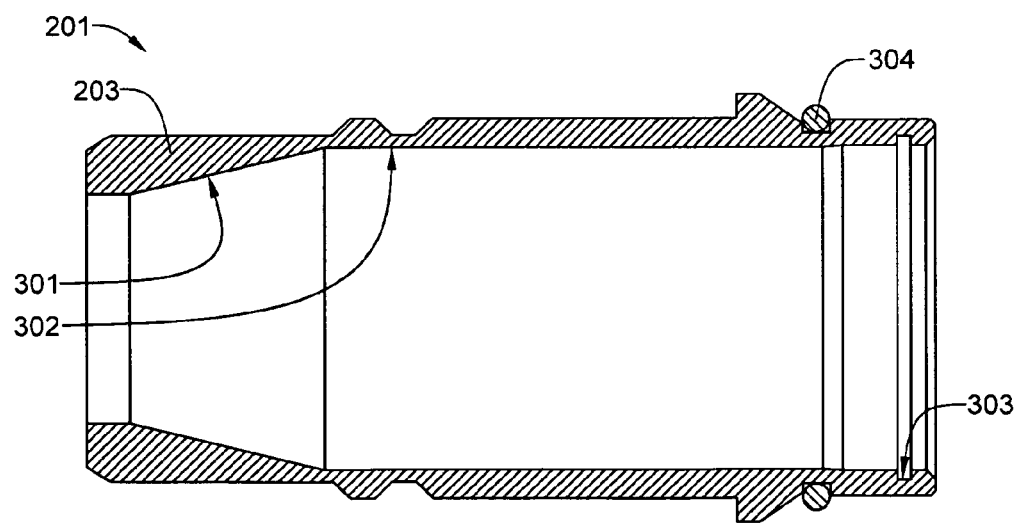
FIG. 3 is a cross-sectional view of the fuel receiver body, taken through section line 3-3 of FIG. 2.

Referring now to FIG. 3, this cross-sectional view of the fuel receiver body 201 shows the inner profile thereof, being a generally tubular chamber open at both ends. The male coupler portion 203 of the fuel receiver body 201 has an expanding conically-shaped inlet 301, which transitions to a generally cylindrical chamber 302. There is a snap ring groove 303 near the outlet end of the generally cylindrical chamber 302. It will be noted that an O-ring 304 has been installed in the O-ring groove 207.

Figure 4:
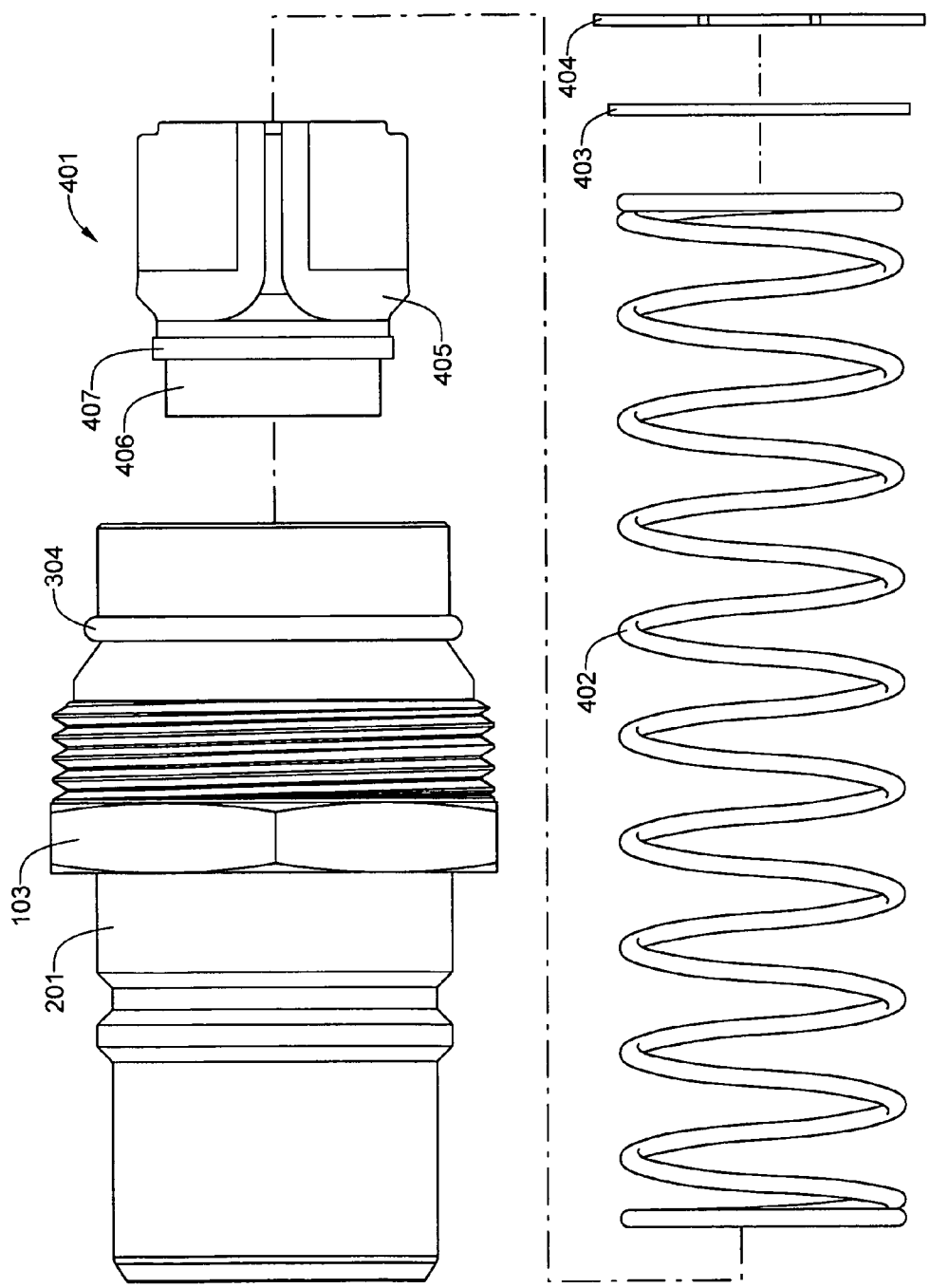
FIG. 4 is an exploded side elevational view of the fuel receiver on which has been installed a fuel receiver securing nut and O-ring.

Referring now to FIG. 4, this exploded view of the fuel receiver 101 shows the internal components of the fuel receiver 101, and further shows the sequence in which they are installed within the fuel receiver body 201. A valve plug 401 is first inserted within the fuel receiver body 201, followed by a fuel receiver coil spring 402, a backing washer 403, and an internal snap ring 404. The snap ring 404 is seated within the snap ring groove 303 and secured the valve plug 401, the fuel receiver coil spring 402 and the backing washer within the fuel receiver body 201. The valve plug 401 includes a valve plug body 405, a seal retainer 406 and an annular, stepped neoprene rubber operculum seal 407 sandwiched between the valve plug body 405 and the seal retainer 406.

Figure 5:
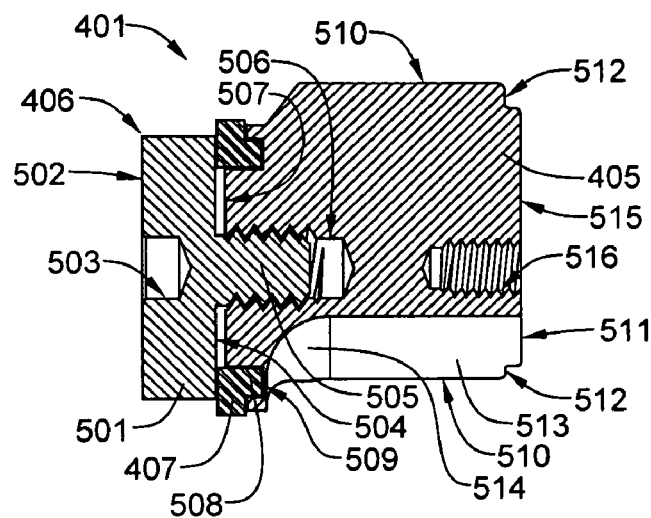
FIG. 5 is a cross-sectional side view of the fuel receiver valve plug, taken through section line 5-5 of FIG. 4.

Referring now to FIG. 5, this cross-sectional view of the valve plug 401 shows additional details of the plug body 405, the seal retainer 406 and the neoprene rubber operculum seal 407. It will be noted that the seal retainer 406 has a cylindrical portion 501 which compresses the neoprene rubber operculum seal 407 against the valve plug body 405. The outer face 502 of cylindrical portion 501 has a central aperture 503, which serves as a guide for the conical end of the nozzle's plug release piston, as the nozzle is coupled to the fuel receiver 101. The inner face 504 of the cylindrical portion 501 has a threaded shaft 505 axially protruding therefrom, which engages a threaded aperture 506 axially positioned within an outer end 507 of the valve plug body 405. It will be noted that the neoprene rubber operculum seal 407 has an annular shoulder 508 that fits into an annular groove 509 in the outer end 507 of the valve plug body 405. It will be further noted that the valve plug body 405 has a trio of fins 510 (two of which are visible in this cross-sectional view). The fins 510 are angularly evenly spaced from one another, and the inner end 511 of each fin 510 has a notch 512, which functions as a seat for the end of the fuel receiver coil spring 402. Region 513 of the visible fin 510 is a generally planar surface, while region 514 is a generally concave surface. The inner end 515 of valve plug body 405 may be equipped with an optional threaded aperture 516. For certain applications, it may be desirable to equip the fuel receiver and check valve assembly 100 with the check valve poppet engagement rod shown in FIG. 30. The threaded end of the poppet engagement rod installs in the threaded aperture 516, and mechanically opens the check valve when the valve plug 401 is depressed by the nozzle plug release piston.

Figure 6:
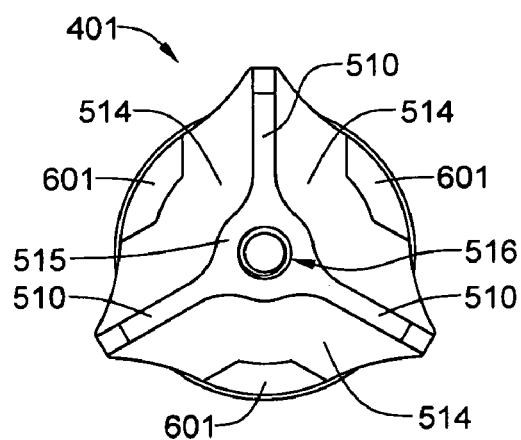
FIG. 6 is a rear elevational view of the fuel receiver valve plug.

Referring now to FIG. 6, this view of the inner end 515 of valve plug 401 shows the three fins 510, the threaded aperture 516 and the concave regions 514, as well as additional planar surface regions 601. A portion of the periphery of the neoprene rubber operculum seal 407 can also be seen in this view.

Figure 7:
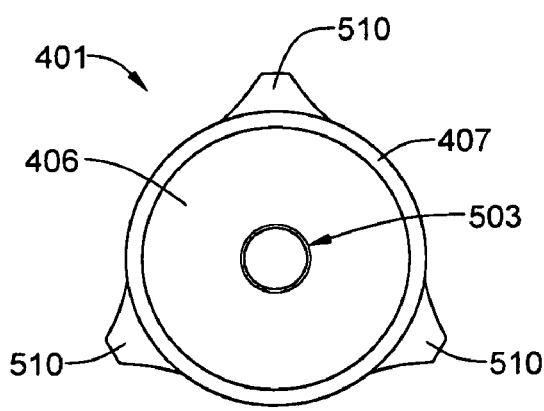
FIG. 7 is a front elevational view of the fuel receiver valve plug.

Referring now to FIG. 7, in this front view of the fuel receiver valve plug 401, the seal retainer 406 and its central aperture 503 are visible, as are the three fins 510, and the neoprene rubber operculum seal 407.

Figure 8:
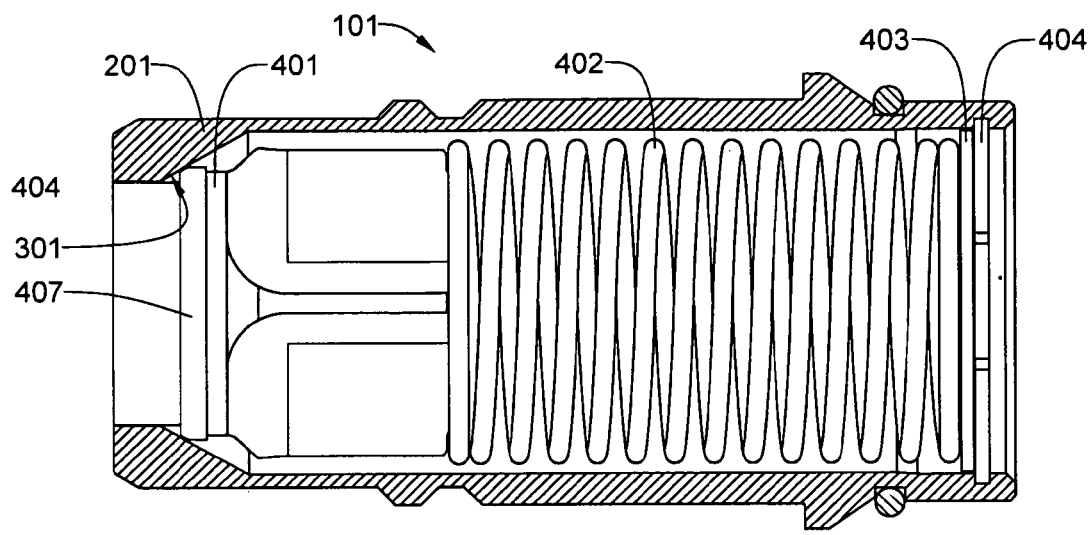
FIG. 8 is a partial cross-sectional view of an assembled fuel receiver in a closed configuration, with only the fuel receiver body and surrounding O-ring shown in cross-sectional format, and the fuel receiver valve guide, the fuel receiver spring, the backing washer and internal snap ring shown installed therein.

Referring now to FIG. 8 this view of a fully assembled fuel receiver 101, with the fuel receiver body 201 in cross-sectional format, shows how the internal components are assembled and positioned when the fuel receiver 101 is closed. The fuel retainer coil spring 402 is compressed between the valve plug 401 and the backing washer 403, the latter being held in place by the internal snap ring 404. In the closed position, the outer periphery of the neoprene rubber operculum seal 407 is compressed against the conically-shaped inlet 301 of the fuel receiver body 201.

Figure 9:
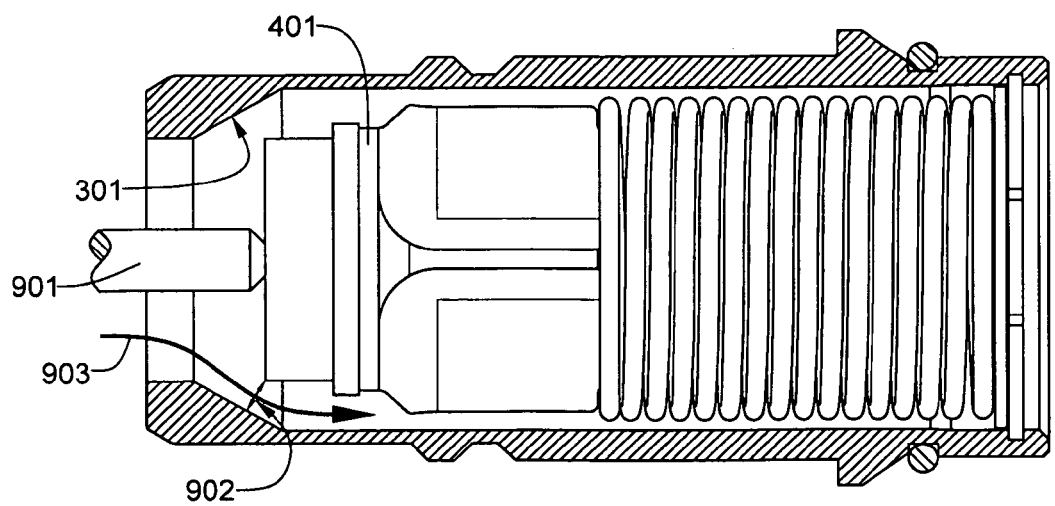
FIG. 9 is a parial cross-sectional view of the assembled fuel receiver of FIG. 8, shown in an open configuration.

Referring now to FIG. 9, the valve plug 401 has been moved to the right by a plug release piston 901, thereby further compressing the fuel receiver coil spring 402 and creating a circumferential gap 902 between the valve plug 401 and the conically-shaped inlet 301. The arrows 903 show the route of flow of fuel into the cylindrical chamber 302 of the fuel receiver 201.

Referring now to FIGS. 10 to 12, the annular securing nut 103 is shown from three different angles. The inside diameter d is sized so the annular securing nut 103 will slide easily over the fuel receiver body 201 and make circumferential contact with the annular shoulder 206 thereof. The male threaded portion 1101 of the annular securing nut 103 is designed to engage the female threaded portion at the entrance end of the check valve 102, as seen in the cross-sectional view thereof in FIG. 18.

Referring now to FIG. 13, the backing washer 403 is used to provide an planar annular base of 360 degrees so that, in combination with the internal snap ring 404, the fuel receiver coil spring 402 may be securely retained within the fuel receiver body 201.

Referring now to FIG. 14, a top view of the internal snap ring 404 is shown. The pair of apertures 1401 may be engaged with the points of a pair of snap ring pliers to compress and then release the internal snap ring 404 so that it may be installed within the snap ring groove 303 within the fuel receiver body 201.

Referring now to FIG. 15, the exploded view of the check valve 102 shows all of the internal and external components associated therewith. The check valve 102 includes a check valve body 1501, a check valve coil spring 1502, a check valve poppet 1503, a laminar neoprene rubber seal 1504, a laminar fender washer 1505, a split-ring lock washer 1506, and an allen-head screw 1507 that secures the split-ring lock washer 1506, the fender washer 1505, and the laminar neoprene rubber seal 1504 to the check valve poppet 1503. On the check valve poppet 1503 can be seen concave surface regions 1508, concave surface regions 1509 and double concave surface regions 1510.

Referring now to FIG. 16, the check valve poppet 1503 has three fins 1601, each of which has a spring retaining tab 1602. The check valve coil spring 1502 is compressed between the spring retaining tabs 1602 and a flanged opening (not shown in this view-see FIG. 18) at the exit end of the check valve body 1501.

Referring now to FIG. 17, this outer end view of the check valve poppet 1503 shows a threaded hole 1701 in which the allen-head screw 1507 is secured. Each of the spring retaining tabs 1602 can also be seen in this view.

Referring now to FIG. 18, the check valve body 1501, like the fuel receiver body 201, is also a generally tubular chamber open at both ends. The flanged opening 1801 is visible here. The internal threads 1802 engage the male threaded portion 1101 of the annular securing nut 103. The external threads 1803 are tapered pipe threads and are sized to engage the fuel tank coupling (not shown). Except for the asymmetry created by the threading, the check valve body 1501 is radially symmetrical about it central axis 1804. It will be noted that the check valve body 1501 has an internal cylindrical portion 1805. The O-ring 304 (see FIG. 3) is compressed between this internal cylindrical portion 1805 and the bottom of O-ring groove 207, thereby sealing the connection of the fuel receiver body 201 and the check valve body 1501.

Referring now to FIG. 19, the generally tubular interior of the check valve body 1501 is readily apparent in this view. It will be noted that the check valve body 1501 is fitted with a generally hexagonal exterior head 1901 so that it can be tightened within the fuel tank coupling using a wrench.

Referring now to FIG. 20, the allen-head screw 1507 is seen in a head-end view.

Referring now to FIG. 21, the split-ring lock washer 1506 shown in a profile view in FIG. 15 is seen in a top or bottom view. For a preferred embodiment of the invention, the split-ring lock washer 1506 is hardened spring steel.

Referring now to FIG. 22, the fender washer 1505 shown in a profile view in FIG. 15 is shown here in a top or bottom view.

Referring now to FIG. 23, the rubber seal 1504 shown in a profile view in FIG. 15 is shown herein a top or bottom view.

Figure 24:
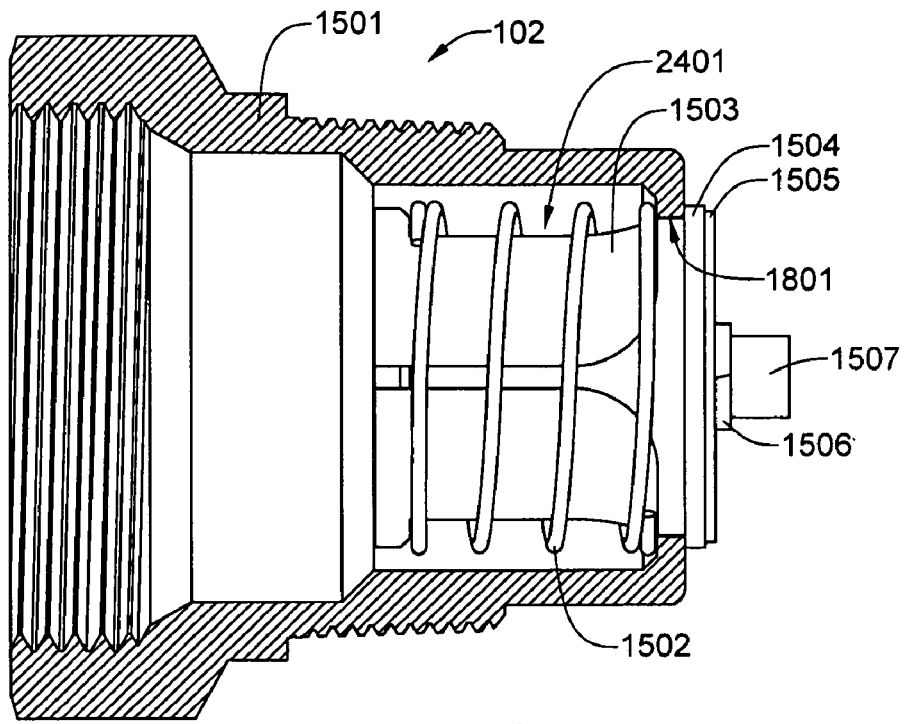
FIG. 24 is a partial cross-sectional view of an assembled check valve in a closed configuration, with only the check valve body shown in cross-sectional format, and the check valve poppet, check valve spring, seal, fender washer, lock washer and seal-retaining socket-head screw shown installed therein.

Referring now to FIG. 24, this view of a fully assembled check valve 102, with the check valve body 1501 in cross-sectional format, shows how the internal components are assembled and positioned when the check valve 102 is closed. The check valve coil spring 1502 is compressed between the check valve poppet 1503 and the internal annular flange 1801. As the laminar neoprene rubber seal 1504 and fender washer 1505 has larger external diameters than the flanged opening 1801 of the check valve body 1501, the flanged opening 1801 is sealed by the laminar neoprene rubber seal 1504 when the fuel pressure within the check valve body 1501 is less than the spring pressure plus the fuel pressure within the fuel tank, thereby cutting fuel flow through the check valve 102. With the allen-head screw 1507 secured within the threaded hole 1701, the allen-head screw 1507, the split-ring lock washer 1506, the fender washer 1505 and the laminar neoprene rubber seal 1504 and the check valve poppet 1503 are unified as an check valve poppet assembly 2401.

Figure 25:
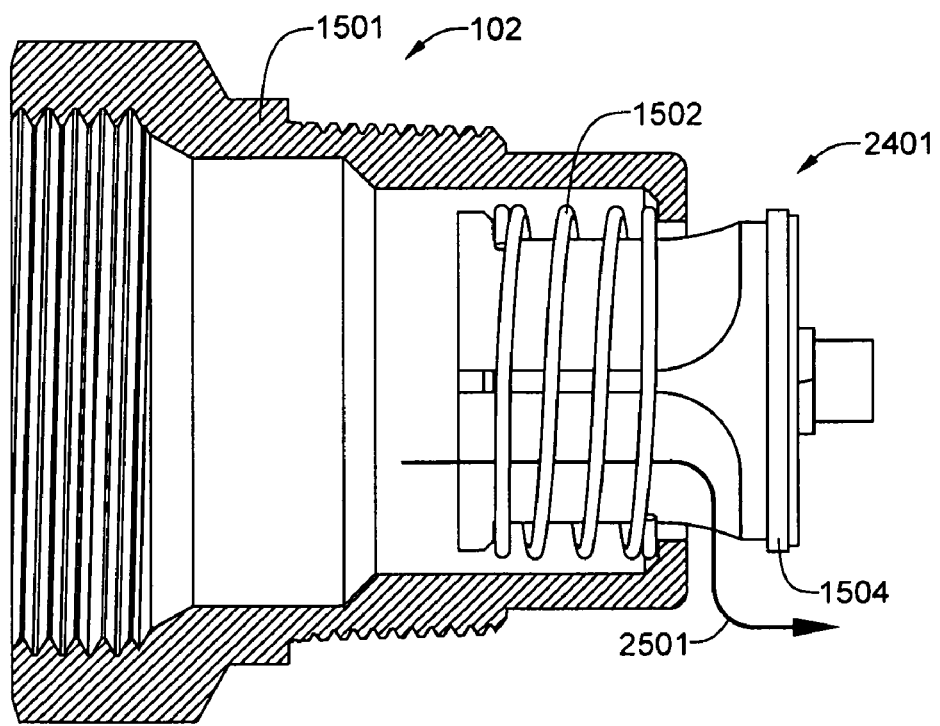
FIG. 25 is a partial cross-sectional view of the assembled check valve of FIG. 24, shown in an open configuration.

Referring now to check valve 102 of FIG. 25, the check valve poppet assembly 2401 has been moved to the right, either by the fuel pressure within the check valve body 1501 being greater than the check valve spring pressure plus the fuel pressure within the fuel tank, or by mechanical movement, thereby further compressing the check valve coil spring 1502 and unseating the laminar neoprene rubber seal 1504 so that fuel can flow through the check valve 102 via route 2501.

Figure 26:
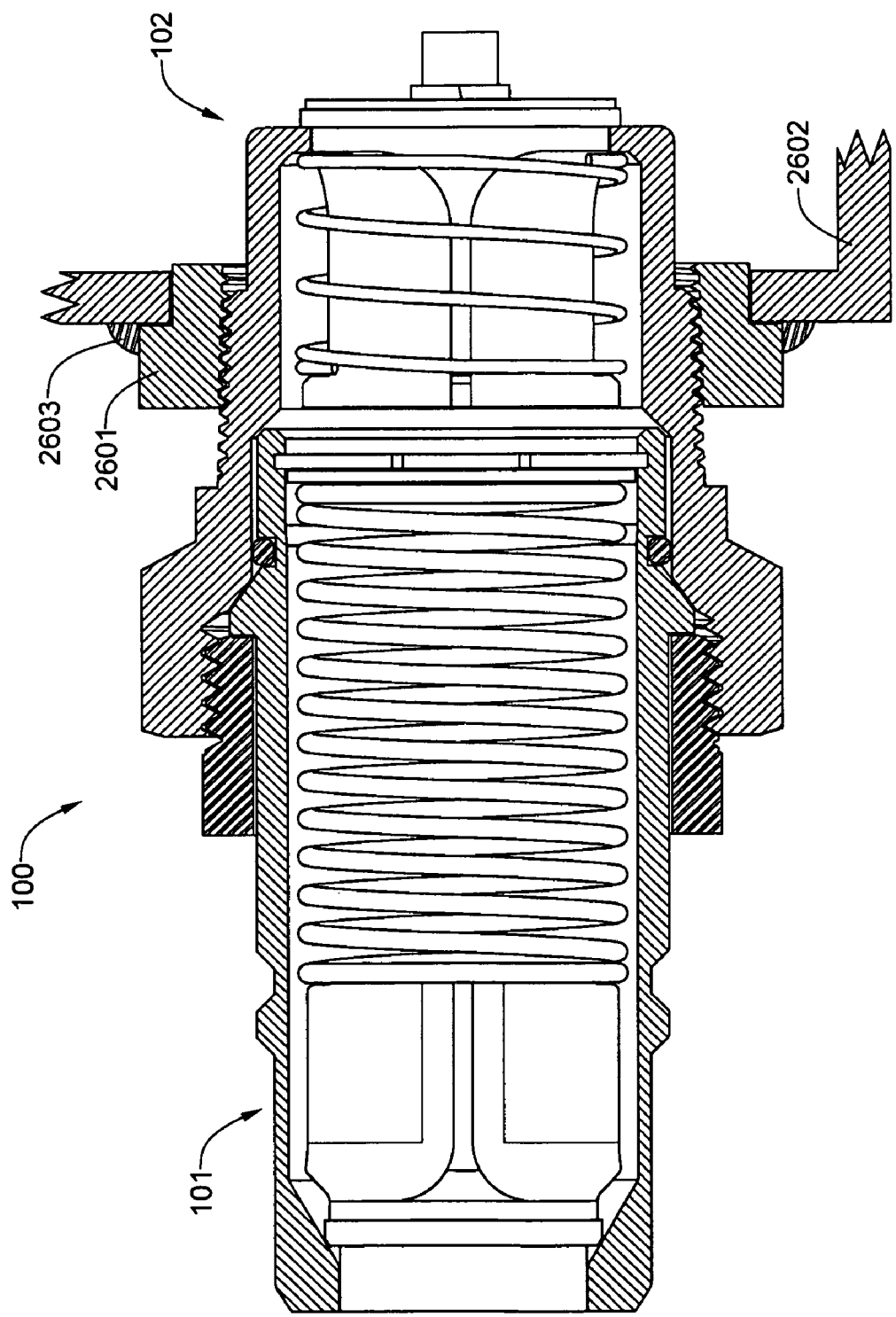
FIG. 26 is a partial cross-sectional side view of the complete fuel receiver and check valve assembly of FIG. 1, with only the fuel receiver body, O-ring, annular securing nut and check valve body shown in cross-sectional format, and the other components shown installed therein.

Referring now to FIG. 26, a complete fuel receiver and check valve assembly 100 is shown in a closed configuration installed within the female-threaded pipe coupling 2601 of the fuel tank 2602 in partial cross-sectional format. A weld or brazing 2603 around the circumference of the pipe coupling 2601 secures and seals the pipe coupling 2601 to the fuel tank 2602. The operation of both the fuel receiver assembly 101 and the check valve 102 should now be quite obvious in view of the foregoing description thereof.

Figure 27:
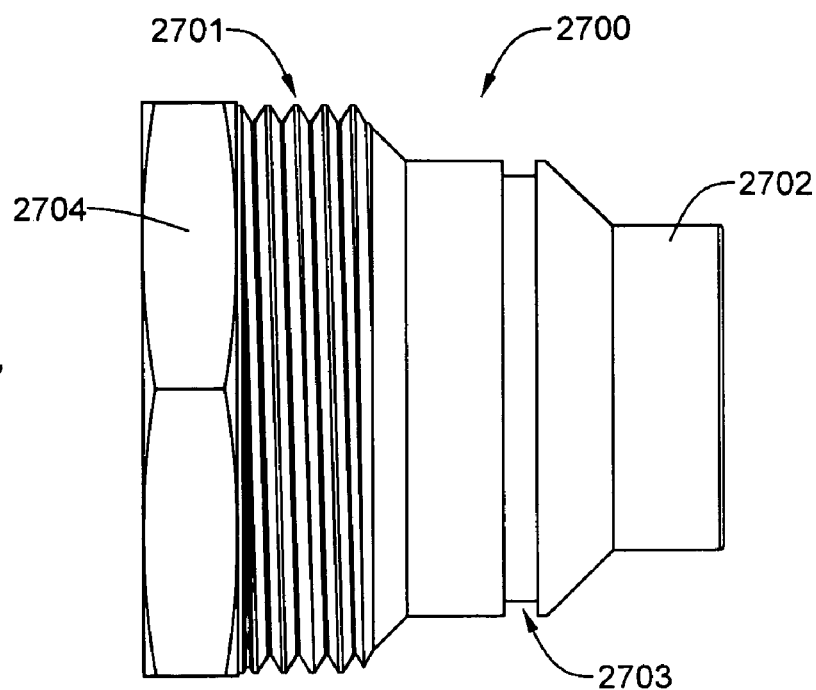
FIG. 27 is a side elevational view of the check valve drain insert.

Referring now to FIG. 27, a check valve drain insert 2700 is shown. The drain insert 2700 is utilized to drain the fuel tank after removal of the fuel receiver assembly 101. As the external threads 2701 of the drain insert engage the internal threads 1802 of the check valve body 1501, the nose 2702 of the check valve drain insert 2700 displaces the check valve poppet assembly 2402, thereby compressing the check valve coil spring 1502 and unseating the laminar neoprene rubber seal 1504 so that fuel can flow from the fuel tank out through both the check valve 102 and the check valve drain insert 1700. It will be noted that like the fuel receiver body 201 and the check valve body 1501, the check valve drain insert 2700 is a generally tubular interior open at both ends.

Figure 28:
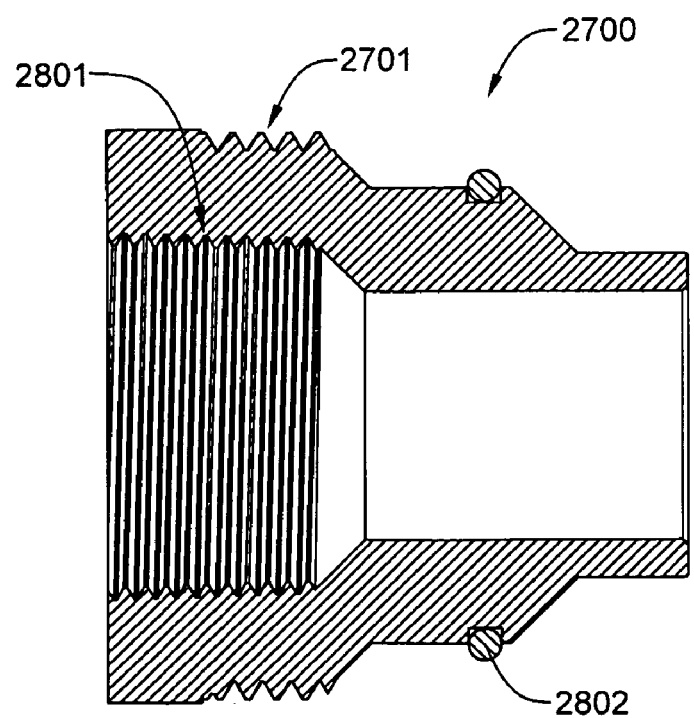
FIG. 28 is a cross sectional view of the check valve drain insert and surrounding O-ring taken through the central axis of the check valve drain insert.

Referring now to FIG. 28, it will be noted that the check valve drain insert 2700 has internal threads 2801 for the attachment of a hose coupling (not shown).

Figure 29:
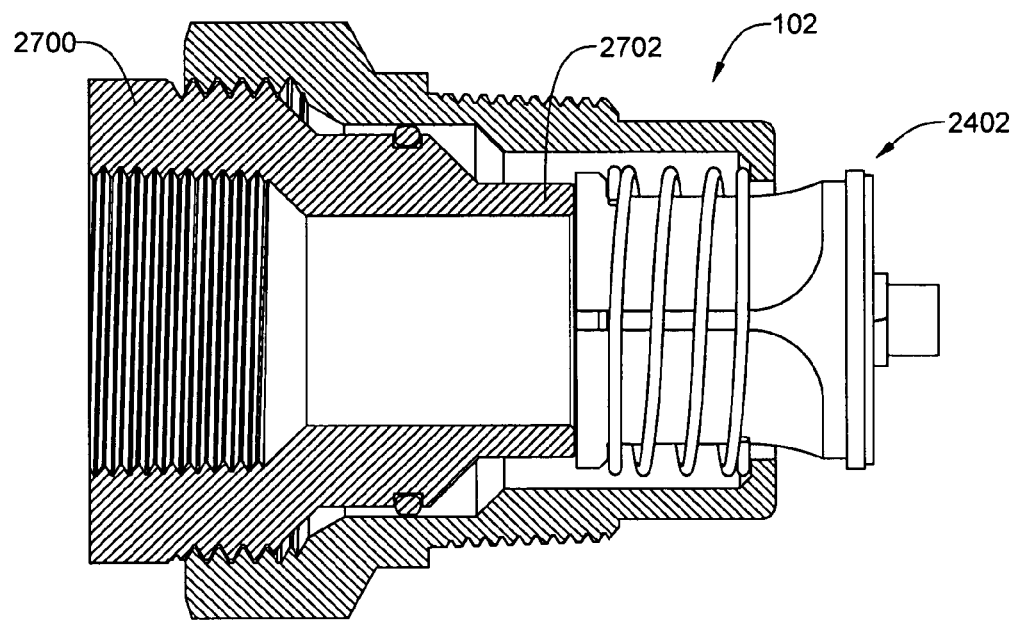
FIG. 29 is a partial cross-sectional side view of a check valve drain insert installed within the check valve, with only the drain insert, check valve body and O-ring shown in cross section.

Referring now to FIG. 29, this partial cross-sectional side view shows a check valve drain insert 2700 installed within the check valve 102. It can be seen that the nose 2702 of the check valve drain insert 2700 has displace the check valve poppet assembly 2402, thereby opening the check valve 102.

Figure 30:
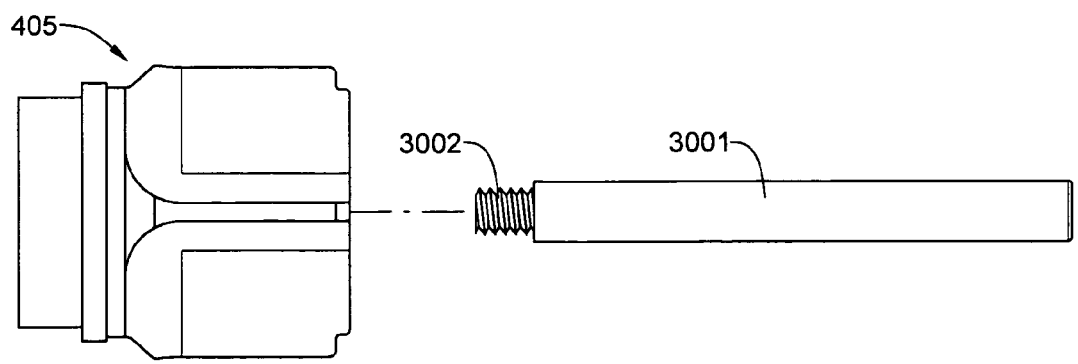
FIG. 30 is an exploded side elevational view of the fuel receiver valve plug and an optional check valve poppet engagement rod.

Referring now to FIG. 30, a fuel receiver valve plug 401 is shown in combination with a check valve poppet engagement rod 3001, the threaded end 3002 of which screws into the threaded aperture (see item 516 of FIG. 5) of the fuel receiver valve plug body 405, and mechanically displaces the check valve poppet assembly 2402 when the valve plug 401 is depressed by the nozzle plug release piston. It should be emphasized that this is an alternative embodiment of the invention, as fuel pressure alone, supplied by an external pump, is sufficient to displace the valve poppet assembly 2402.

Figure 31:
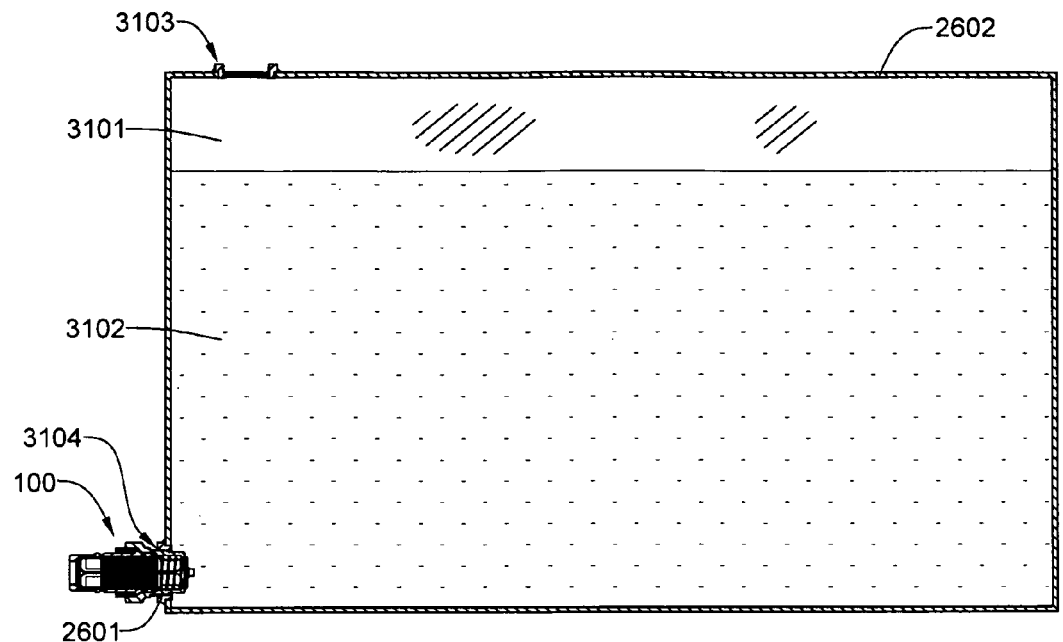
FIG. 31 is a cross-sectional side view of a partially-filled liquid fuel storage assembly consisting of a conventional, bottom-filled tank having a coupling sealably installed near the bottom thereof and a fuel receiver and check valve assembly fabricated in accordance with the present invention, which is threadably installed in the coupling.

Referring now to FIG. 31, the partial view of the assembly of FIG. 10 has been expanded to show the conventional fuel tank 2602 in its entirety. It will be noted that the tank 2602 has an interior volume 3101, which has been partially filled with a liquid fuel 3102. A first coupling 2601 installed near the bottom of the tank 2602 has an opening 3104 that is in communication with the interior volume 3102. A second coupling 3103 is installed in the top of the tank 2602. Typically, either a vent or an electric fuel pump (not shown) is installed in the second coupling 3103. It should be evident that the force of gravity acting on the fuel 3102 in the tank 2602 generates fuel pressure at the opening 3104 of the first coupling 2601.

Figure 32:
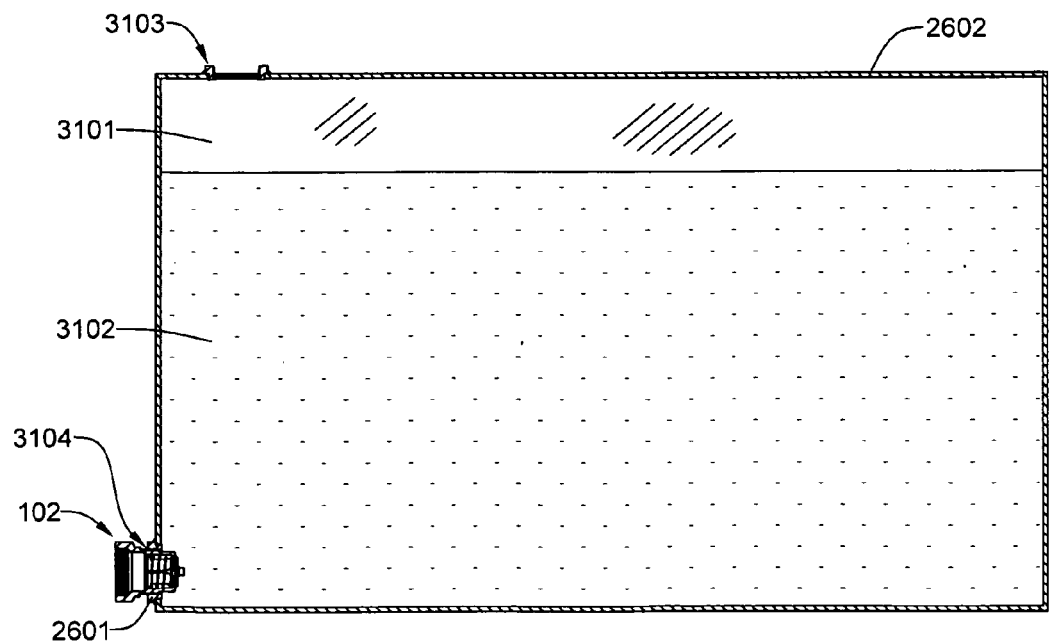
FIG. 32 is a view of the partially-filled liquid fuel storage assembly of FIG. 31, following removal of the receiver from the fuel receiver and check valve assembly.

Referring now to FIG. 32, the receiver 101 has been removed from the fuel receiver and check valve assembly 100, leaving only the check valve 102 installed in the first coupling 2601. The check valve 102, which is subjected to the gravity-generated fuel pressure, prevents escape of fuel 3102 from the tank 2602.

Although only several embodiments of the fuel receiver and check valve assembly 100 have been shown and described herein, it will be obvious to those having ordinary skill in the art that changes and modifications may be made thereto without departing from the scope and the spirit of the invention.

What is claimed is:

1. A liquid fuel storage reservoir assembly comprising:
   an enclosed tank having a threaded coupling sealably installed at or near the bottom thereof, said coupling having an opening in communication with a fillable interior volume of the tank;
   a quantity of fuel at least partially filling said tank;
   a fuel receiver and check valve assembly having:
      a check valve body having a flow-through chamber, an entrance end, and an exit end threaded to engage the threaded coupling;
      a spring-loaded, normally-closed valve that blocks said flow-through chamber when closed, thereby being subjected to gravity-generated pressure from said quantity of fuel, and that opens said flow-through chamber during tank filling operations;
      a fuel receiver body having a generally tubular chamber, said generally tubular chamber having an entrance end that is coupleable to a fuel nozzle, and an exit end that is coupleable to the entrance end of said check valve body; and
      a spring-biased valve plug that seals the entrance end of said generally tubular chamber except during tank filling operations.

2. The liquid fuel storage reservoir assembly of claim 1, wherein the entrance end of said check valve body is a threaded socket, said fuel receiver body has an annular circumferential shoulder near said exit end, and said fuel receiver and check valve assembly further comprises an annular securing nut that bears against said annular circumferential shoulder an engages the threaded socket so as to couple the fuel receiver body to the check valve body.

3. The liquid fuel storage reservoir assembly of claim 1, wherein said spring-loaded, normally-closed valve is a poppet valve that is opened by a build-up of fuel pressure within the flow-through chamber, said poppet valve having a check valve poppet that, when the poppet valve is closed, is positioned within the check valve body, said poppet valve also having a seal that is secured to an outer end of said check valve poppet, and which seals the exit opening of said flow-through chamber when the poppet valve is closed, said poppet valve being biased to a closed position by a spring that is located entirely within said flow-through chamber, surrounds a major portion of said check valve poppet, and is compressed between an internal flange adjacent the exit end of said flow-through chamber and an inner end of said check valve poppet.

4. The liquid fuel storage reservoir assembly of claim 1, wherein a joint between the fuel receiver body and the check valve body is sealed with an O-ring that installs within an O-ring groove radially positioned on the exterior of the fuel receiver body, said O-ring being compressed by an interior cylindrical sealing surface within the check valve body.

5. The liquid fuel storage reservoir assembly of claim 2, wherein said annular securing nut and said check valve body is each equipped with a wrench-engaging periphery.

6. The liquid fuel storage reservoir assembly of claim 5, wherein each wrench-engaging periphery is generally hexagonally shaped.

7. The liquid fuel storage reservoir assembly of claim 1, wherein the coil spring which biases the valve plug is at all times positioned entirely within said fuel receiver body, and is compressed between an inner end of said valve plug and a snap ring installed within a snap ring groove located adjacent the exit end of said fuel receiver body.

8. The liquid fuel storage reservoir assembly of claim 1, wherein said check valve retains any fuel present in said fuel tank when said fuel receiver is removed from said assembly.

9. The liquid fuel storage reservoir assembly of claim 8, wherein fuel can be drained from the fuel tank when the fuel receiver is removed from said assembly by installing a check valve drain insert within the female-threaded socket of said check valve body, said check valve drain insert having a nose that urges open the spring-loaded, normally-closed valve of the check valve.

10. The liquid fuel storage reservoir assembly of claim 2, which further comprises a check valve engagement rod that mechanically couples said valve plug to said normally closed valve, so that when the former is urged to an open position, the latter is also.

11. A liquid fuel storage reservoir assembly comprising:
an enclosed tank having a threaded coupling sealably installed at or near the bottom thereof, said coupling having an opening in communication with a fillable interior volume of the tank;
a quantity of fuel at least partially filling said tank;
a fuel receiver and check valve assembly having:
  a check valve body having external threads sized to engage the threaded coupling, said check valve body having a flow-through chamber with entrance and exit ends; and
  a spring-loaded, normally-closed valve that blocks said flow-through chamber, except during filling operations, said normally-closed valve being subjected to gravity-generated pressure from said quantity of fuel;
  a fuel receiver body having a generally tubular chamber open at both entrance and exit ends, the entrance end of said tubular chamber having a conical portion expansive toward the tubular chamber exit end, the exit end of said tubular chamber being sealably coupleable to the entrance end of said check valve body;
  a spring loaded valve plug operating to seal said conical portion of said generally tubular chamber when no fuel nozzle is coupled to the fuel receiver.

12. The liquid fuel storage reservoir assembly of claim 11, wherein said spring-loaded, normally-closed valve is a poppet valve that is opened by a build-up of fuel pressure within the flow-through chamber, said poppet valve having a check valve poppet that, when the poppet valve is closed, is positioned within the check valve body, said poppet valve also having a seal that is secured to an outer end of said check valve poppet, and which seals the exit opening of said flow-through chamber when the poppet valve is closed, said poppet valve being biased to a closed position by a spring that is located entirely within said flow-through chamber, surrounds a major portion of said check valve poppet, and is compressed between an internal flange adjacent the exit end of said flow-through chamber and an inner end of said check valve poppet.

13. The liquid fuel storage reservoir assembly of claim 12, wherein said check valve body is equipped with a wrench-engaging periphery so that said check valve body may be tightened in said threaded coupling.

14. The liquid fuel storage reservoir assembly of claim 11, wherein the entrance end of said check valve body incorporates a female-threaded socket, said fuel receiver body has an annular circumferential shoulder near said exit end, and said fuel receiver assembly further comprises an annular securing nut that bears against said annular circumferential shoulder an engages the female-threaded socket so as to couple the fuel receiver body to the check valve body.

15. The liquid fuel storage reservoir assembly of claim 14, wherein a joint between the fuel receiver body and the check valve body is sealed with an O-ring that installs within an O-ring groove radially positioned on the exterior of the fuel receiver body, said O-ring being compressed by an interior cylindrical sealing surface within the check valve body.

16. The liquid fuel storage reservoir assembly of claim 11, wherein the coil spring which biases the valve plug is at all times positioned entirely within said fuel receiver body, and is compressed between an inner end of said valve plug and a snap ring installed within a snap ring groove located adjacent the exit end of said fuel receiver body.

17. The liquid fuel storage reservoir assembly of claim 11, which further comprises a check valve engagement rod that mechanically couples said valve plug to said normally closed valve, so that when the former is urged to an open position, the latter is also.

18. In combination with a liquid fuel storage reservoir assembly comprising:
an enclosed tank having a threaded coupling sealably installed at or near the bottom thereof, said coupling having an opening in communication with a fillable interior volume of the tank;
a quantity of fuel at least partially filling said tank; and
a check valve assembly having:
  a check valve body having external threads sized to engage the threaded coupling, said check valve body having a flow-through chamber with entrance and exit ends; and
  a spring-loaded, normally-closed valve that blocks said flow-through chamber, except during filling operations, said normally-closed valve being subjected to gravity-generated pressure from said quantity of fuel;
a check valve drain insert installable within the entrance end of said check valve body, said check valve drain insert having a nose that urges open the spring-loaded, normally-closed valve of the check valve, thereby permitting the draining of the fuel tank.

19. The combination of claim 18, wherein the entrance end of said check valve body and the check valve drain insert are equipped with mating threads for mutual engagement, and said check valve drain insert is equipped with a wrench-engaging periphery for securing the engagement.

* * * * *